US011856099B2

United States Patent
Vágujhelyi et al.

(10) Patent No.: US 11,856,099 B2
(45) Date of Patent: Dec. 26, 2023

(54) CRYPTOGRAPHIC PSEUDONYM MAPPING METHOD, COMPUTER SYSTEM, COMPUTER PROGRAM AND COMPUTER-READABLE MEDIUM

(71) Applicant: Xtendr Zrt., Budapest (HU)

(72) Inventors: Ferenc Vágujhelyi, Budapest (HU); Gergely Vágujhelyi, Budapest (HU)

(73) Assignee: Xtendr ZRT., Budapest (HU)

( * ) Notice: Subject to any disclaimer, the term of this patent is extended or adjusted under 35 U.S.C. 154(b) by 0 days.

(21) Appl. No.: 17/899,035

(22) Filed: Aug. 30, 2022

(65) Prior Publication Data

US 2022/0417018 A1 Dec. 29, 2022

Related U.S. Application Data

(63) Continuation of application No. 17/627,734, filed as application No. PCT/HU2020/050031 on Jul. 14, 2020, now abandoned.

(30) Foreign Application Priority Data

Jul. 15, 2019 (HU) .................................. P1900254

(51) Int. Cl.
*H04L 29/06* (2006.01)
*H04L 9/30* (2006.01)
(Continued)

(52) U.S. Cl.
CPC .......... *H04L 9/3066* (2013.01); *H04L 9/0894* (2013.01); *H04L 9/50* (2022.05); *H04L 2209/42* (2013.01)

(58) Field of Classification Search
CPC ......... H04L 9/3247; H04L 9/088; H04L 9/30; H04L 61/10; H04L 61/3025; H04L 9/50; H04L 61/45
See application file for complete search history.

(56) References Cited

U.S. PATENT DOCUMENTS 10,304,062 B1 5/2019 Hines
2005/0096124 A1* 5/2005 Stronach ................. G07F 17/32
463/25

(Continued)

FOREIGN PATENT DOCUMENTS

EP 3188070 7/2017
WO 2021009529 1/2021

OTHER PUBLICATIONS

European Patent Office, International Search Report and International Preliminary Report on Patentabiliy in PCT Application No. PCT/HU2020/050031, dated Jul. 5, 2021 (24 pgs.).

(Continued)

*Primary Examiner* — Joseph P Hirl
*Assistant Examiner* — Leynna Truvan
(74) *Attorney, Agent, or Firm* — Wood Herron & Evans LLP

(57) ABSTRACT

The invention is a cryptographic pseudonym mapping method for an anonymous data sharing system, the method being adapted for generating a pseudonymised database (DB) from data relating to entities and originating from data sources ($DS_i$), wherein the data are identified at the data sources ($DS_i$) by entity identifiers (D) of the respective entities, and wherein the data are identified in the pseudonymised database (DB) by pseudonyms (P) assigned to the respective entity identifiers (D) applying a one-to-one mapping, irrespective of the originating data source. According to the invention, more than one mapper ($M_j$) is applied, and a respective pseudonym (P) is generated by sequentially performing, in a permutation of the mappers ($M_j$), a number k of mappings utilizing the mapping cryptographic keys ($h_{ij}$) of the mappers ($M_j$) belonging to the particular data source ($DS_i$) on each encrypted entity identifier ($C_{i0}$) encrypted by the data source ($DS_i$).

13 Claims, 3 Drawing Sheets

(51) Int. Cl.
  *H04L 9/00* (2022.01)
  *H04L 9/08* (2006.01)

(56) References Cited

U.S. PATENT DOCUMENTS

2017/0330159 A1* 11/2017 Castinado .............. G06Q 20/02
2019/0213356 A1    7/2019 Vágujhelyi

OTHER PUBLICATIONS

Patil Shravani Mahesh et al: "RSA-Based Collusion Resistant Quorum Controlled Proxy Re-encryption Scheme for Distributed Secure Communication" Dec. 11, 2018, Advances in Databases and Information Systems; Springer International Publishing, Cham, pp. 349-363, XP047499105, ISBN: 978-3-319-10403-4 [retrieved on Dec. 1, 2018]1 section 2 section 5, http://dx.doi.org/10.1007/978-3-030-05366-6_29.

John M. Delaurentis: "A further Weakness In the Common Modulus Protocol For The RSA Cryptoalgorithm", vol. 8, No. 32, Jul. 1, 1984 (Jul. 1, 1984), pp. 253-259, XP055737288, US, ISSN: 0161-1194, DOI: 10.1080/0161-118491859060, http://dx.doi.org/10.1080/0161-118491859060.

Giusepe Ateniese et al: "Improved Proxy Re-Encryption Schemes with Applications to Secure Distributed Storage," IACR, International Association for Cryptologic Research, vol. 20060111:153421, Jan. 11, 2006 (Jan. 22, 2006), pp. 1-25, XP061001560, DOI: 10.1145/1127345.1127346 [retrieved on 2006-04-211] section 3.1.

Ivan A et al: "Proxy Cryptography Revisited," Proceedings of the Symposium on Network And Distributed Systemsecurity, XX, XX, Feb. 1, 2003 (Feb. 1, 2003), pp. 1-19, XP002237307, section 4.

European Patent Office, International Search Report in PCT Application No. PCT/HU2020/050032, dated Nov. 9, 2020 (3 pgs.).

European Patent Office, International Preliminary Report on Patentabiliy in PCT Application No. PCT/HU2020/050032, dated Jun. 22, 2021 (18 pgs.).

\* cited by examiner

CRYPTOGRAPHIC PSEUDONYM MAPPING METHOD, COMPUTER SYSTEM, COMPUTER PROGRAM AND COMPUTER-READABLE MEDIUM

CROSS REFERENCE TO RELATED APPLICATIONS

This application is a continuation of U.S. application Ser. No. 17/627,734 filed Jan. 17, 2022, which claims priority, under Section 371, and/or as a continuation under Section 120, to PCT Application No. PCT/HU2020/050031 filed Jul. 14, 2020, which claims priority to Hungarian Application No. P1900254 filed Jul. 15, 2019.

TECHNICAL FIELD

The invention relates to a cryptographic method and computer system for pseudonym mapping, a computer program and a computer-readable medium, preferably for implementing a system for data sharing wherein the data can be analysed in an anonymous manner. The invention provides a secure pseudonymisation solution that complies with the regulations of GDPR.

BACKGROUND ART

WO 2017/141065 A1 entitled "Data management method and registration method for an anonymous data sharing system, as well as data manager and anonymous data sharing system" discloses a solution for analysing data residing with multiple mutually independent entities—hereinafter, data sources—in a way that the data are loaded in a single unified database in which the identifiers of the entities (for example, persons, companies) are stored applying pseudonyms adapted for protecting anonymity, ensuring that the original data cannot be restored from the pseudonyms. The present invention complements the solution disclosed in WO 2017/141065 A1 with a pseudonym mapping method that is secure from a number-theoretical aspect. However, security risks for the process of assigning the pseudonyms to the original identifiers are posed not only by the vulnerability to number-theoretical attacks of the pseudonym mapping algorithm. In WO 2017/141065 A1 a detailed description of measures that have to be taken, in addition to providing the pseudonym mapping method, in order to secure the anonymity of the database containing the pseudonyms is provided. These are, among others, the prohibition of assigning attributes to data, the analysis of k-anonymity and I-diversity, or the prevention of node identification based on the morphological properties of the graph reflecting the interrelations of entities. All the methods described in the referenced document can also be applied in the present invention, including the case wherein ensuring the anonymity of the data sources is also a requirement. This is especially important in the case when the data sources report data related to themselves.

Nowadays, almost all real-world events leave traces in the form of data stored in the digital space. The analysis of these data allows for making valuable inferences. The data are stored at a plurality of entities that are usually not in a dependent relationship with one another. The data are often characteristic of entities (for example, persons, companies, institutions, properties, apparatuses, financial assets, etc.) or describe the behaviour thereof. In the databases, the entities are referred to applying widely known entity identifiers (for example, social security number, tax number, land registry number). The analysable data that are characteristic of the entities according to the entity identifiers are called attributes.

An analysis that better approximates reality can be carried out concerning the behaviour and the interrelations of the entities in case the widest possible scope of data can be utilized for the analysis. The best way to do that would be to analyse all the available data applying a single database. However, the databases often contain confidential information, or—for example in the case of natural persons—legally protected information. This sets limits for data managers in sharing the data managed by them for aggregated analytical purposes. Because of that, the data managers, i.e. the data sources have to pass on the data such that the entities performing the pseudonymisation mapping and the analysis applying the common database are not able to access the original entity identifier. This is feasible because, in most cases, the aim of the analysis is not understanding the properties, behaviour or contact network of a particular person or thing, but recognising patterns of behaviour that can be expected from (anonymous) individuals in a larger population, analysing the structure of contact networks, and making inferences related to the future course of events.

The requirements set for the mapping between the unencrypted, open entity identifier and the anonymous identifier (hereinafter: pseudonym) stored in the common database, are defined by the method disclosed in WO 2017/141065 A1. This mapping can be practically implemented only by utilizing a special information-technology device, namely, a cryptoprocessor (a dedicated computer unit that performs cryptographic operations under physically protection). In open multi-user systems this poses problems for the applicability of the system. In contrast to the mappings carried out in a single step, the known technical solution usually provides protection against "brute force"-type attacks (wherein by possessing information on the operation of the encryption system, the applied key is determined by trying each possible key), but malicious cooperation between a data source and the entity performing the mapping can be prevented only by applying a complementary method, for example by encrypting the mapped values by an additional entity.

The pseudonym can be applied for the purposes of the above described analysis if a given open entity identifier is entered into the common database under the same pseudonym, irrespective of which data source sent it, i.e. the mapping between the unencrypted identifiers and the pseudonyms has to be a one-to-one mapping, where the inverse of the mapping cannot be computed, i.e. the unencrypted entity identifier cannot be generated from the pseudonym, by any entity. If the mapping is carried out by the data sources, then they also have to apply the same mapping. If an algorithmically non-reversible mapping is required, then a cryptographic hash function is usually applied, with the unencrypted data being the input of the function, and the output value being in the case the pseudonym. What poses a problem is that the multiplicity of the entity identifiers is usually low, on the order of between a hundred million and a few tens of billions. For such a manifold, a rainbow table (a pre-computed table for inverting cryptographic hash functions) can be generated in a very short time. Therefore, in the course of computing the hash value, the input data are complemented with "salt" (randomly chosen data applied as additional input data of hash functions). In such a case, all entities have to apply the same "salt" so that the one-to-one relationship can be maintained. However, data that are used by all of the data sources can hardly be regarded a secret, or, to perform the calculations it is not even necessary to know the value if the attacker can access the system of any of the data sources (for example, the attacker can be one of the data sources that is not restricted in any way in performing an arbitrary number of mappings).

Another possibility is to entrust the generation of the relation between the unencrypted data or the data encrypted by the data sources applying the same encryption and the pseudonym to a trusted cooperator. The trusted cooperator is able to compile the rainbow table—trivially in the first case, and in the second case, by gaining access to only a single data source's system. Therefore, the solution according to WO 2017/141065 A1 (US 2019/213356 A1) came to the conclusion that the data sources have to apply an encryption method based on a unique, for example, an own, cryptographic key. In such a case, the same entity identifier is sent by the data sources as different ciphers (encrypted data), while pseudonym mapping has to be performed such that the different ciphers have to be assigned to the same pseudonym if the particular ciphers were computed from the same unencrypted identifier. In the solution implemented according to the document, RSA keys are applied, wherein the decryption key is stored in a Trusted Platform Module (TPM, see for example ISO/IEC 11889), the decryption process and the mapping of the unencrypted data into the pseudonym is carried out utilizing a secure cryptoprocessor. This architecture is difficult to implement and requires significant initial investment, while its operation is also cumbersome because the required hardware infrastructure scales linearly with the number of data sources.

EP 3 188 070 A1 discloses a double encryption method, while proxy cryptography is disclosed in Patil Shravani Mahesh et al, "RSA-Based Collusion Resistant Quorum Controlled Proxy Re-encryption Scheme for Distributed Secure Communication", 11 Dec. 2018 (2018-12-11), Advances in Databases and Information Systems; [Lecture Notes in Computer Science; Lect. Notes Computer], Springer International Publishing, Cham, page(s) 349-363.

DESCRIPTION OF THE INVENTION

The object of the invention is to eliminate, or to reduce the impact of, the drawbacks of prior art technical solutions, especially the prior art solution presented above.

The primary object of the invention is to provide a cryptographic pseudonym mapping solution that does not require—for performing decryption and for mapping the unencrypted data to the pseudonym—the use of secure hardware, for example a cryptoprocessor.

The objects of the invention have been fulfilled by providing the cryptographic pseudonym mapping method according to claim 1, the computer system according to claim 12, the computer program according to claim 17, and the computer-readable medium according to claim 18. Preferred embodiments of the invention are defined in the dependent claims.

The cryptographic pseudonym mapping method according to the invention is adapted for generating a pseudonymised database from entity data, wherein the data are identified at the data sources utilizing the entity identifiers of the respective entities, and wherein the data are identified in the pseudonymised database utilizing pseudonyms assigned to the respective entity identifiers applying a one-to-one mapping.

The present invention is a solution utilizing characteristics of modular exponentiation performed on residue classes, and the properties of operations based on specially selected discrete points of elliptic curves, and preferably also blockchain technology or a similar technology providing decentralized authenticity that implements the required abstract mapping, while not containing the above mentioned limitations related to the prior art.

In contrast to the prior art, the invention does not require any special hardware for storing the cryptographic keys or for performing calculations, but instead solves the problem by purely cryptographic means. This requires first of all that the entity identifiers have to be assigned to elements of the algebraic (mathematical) structure (see for example in Wikipedia) on which the cryptographic calculations are performed. Information technology devices apply a binary representation of data, so data can be interpreted as positive integers that can be utilized for performing calculations. In the following, it is assumed of the domain of the mappings that it is capable of providing a unique representation of the entity identifiers and the computed ciphers. For example, if the computations are performed on a cyclic group (see for example in Wikipedia) of residue classes, then the modulus is chosen to be large enough that a sufficient number of residue classes are available. Due to the key sizes applied in practical implementations, this does not pose a problem. In the case of modular exponentiation performed on residue classes, for example, the exponent can be represented applying much more bits compared to practically occurring entity identifiers. In such cases, the so-called "padding" of the values can be considered, such that the exponentiation performed with a low base cannot be inverted by ordinary root computation. This occurs in case modular arithmetic is not required during the process of computing the result. Due to the requirement of applying a one-to-one mapping only deterministic padding methods can be applied.

Therefore, a plurality of data sources is considered, each data source comprising a database containing entity identifiers and attributes. The data have to be collected in a common database such that the entity identifiers are included therein applying pseudonyms according to the following:

(1) A given entity identifier has to be mapped to the same pseudonym, irrespective of the data source it was received from.

(2) The same pseudonym must never be assigned to two different entity identifiers.

(3) The relationship between an unencrypted identifier and its pseudonym must not be obtainable by any participant of the system utilizing only the information known by it, even if a data source cooperates with a participant taking part in the mapping with the intention of breaking the encryption.

(4) If an attack is started by one or more—but not all—parties, even in cooperation, in order to disclose the relationship between an unencrypted entity identifier and its pseudonym (for example in order to compile a rainbow table), then it has to be detected by the other parties.

Conditions (1) and (2) together imply that the mapping has to be a one-to-one mapping. Cryptographic mappings meet this requirement, provided we remain inside the domain (in cryptography, the message domain) thereof. Condition (3) excludes all mappings that can be performed by only one or two participants, without cooperating with others. The same follows from condition (4). It must not be possible for the data source to track the steps of the mapping, because otherwise it can trivially obtain the pseudonym as the result of the last computation step. The results of their computations are of course accessible to the entities performing the mapping, so they must not access the unencrypted entity identifiers. This can be provided if the entity identifiers are sent by the data sources to the mapper entities applying their own unique encryption, i.e. utilizing their own cryptographic key, but the data sources either cannot "see" the pseudonym mapping computations or they cannot relate it to the data provided by themselves.

According to the technical solution described in WO 2017/141065 A1, pseudonym mapping has to be performed applying the cipher by breaking down the mapping into steps wherein a given step can be performed only by a single participating entity adapted to perform the mapping:

$$P = g_b(f_{key_i}^{-1}(C_i)) = f_b(f_{key_i}^{-1}(D)))$$

where D is the entity identifier, P is the pseudonym, i is the numeric identifier of the data source, and $C_i$ is the cipher computed applying its own key. The different mappings in an encryption system usually execute the same algorithm applying different keys. Therefore, the mapping g performed applying the key b can be replaced by $f_b$. Applying a single mapper, for example a secure cryptoprocessor, the mapper is adapted for decrypting the cipher, following by mapping the unencrypted data to the pseudonym P applying the pseudonym mapping key b. For example, applying the RSA method (see for example in U.S. Pat. No. 4,405,829 A) the cryptographic key of the i-th data source is ($e_i$, N), where e is the encryption exponent and N is the modulus. The cipher is obtained by the calculation $$C_i \equiv D^{e_i} \bmod N$$

and is sent to the entity performing pseudonym mapping that generates unencrypted data utilizing the decryption key ($d_i$, N), where $d_i$ is the exponent, performing the calculation $$D \equiv C_i^{d_i} \bmod N$$

According to U.S. Pat. No. 4,405,829 A this calculation is performed for example applying a secure cryptoprocessor such that the mapper cannot access the unencrypted data but can use the results for computing the pseudonym. The pseudonym is obtained from the unencrypted data utilizing the cryptographic key (b, N) of the mapping g $f_b$ (here, unlike elsewhere in this description, the ≡ sign denotes identity rather than congruence):

$$P \equiv D^b \bmod N$$

It is important that the values $d_i$ and b cannot be read out from the device performing the computation; such a device is for example the Trusted Platform Module chip. Because both g and f represent modular exponentiation modulo N, hereinafter only f is used. Using the notation of the above example, the entire mapping is $$P \equiv ((D^{e_i} \bmod N)^{d_i} \bmod N)^b \bmod N$$

where the innermost cipher computation utilizing the exponent $e_i$ is performed by the data source, followed by the mapper performing the computation applying the exponent b.

An object is to present a computation method for performing the latter two mappings in the course of which the entity performing the computation i. is not able to access the entity identifier D, i.e. the unencrypted data, and ii. is not able to access the exponent b that is applied for generating a pseudonym from the unencrypted data.

It follows from condition (i.) that the entity performing the computation must also not be able to access $d_i$ because otherwise it could decrypt the cipher. Condition (ii.) is required in order to prevent a successful trial-and-error or rainbow-table based attack by the mapper. In the exemplary mappings, data are represented applying residue classes defined by a positive integer modulus (N).

In the solution according to the invention, decryption applying an inverse key and mapping implemented applying multiple mappers can be performed in an arbitrary number of steps such that unencrypted data (an entity identifier) is not generated in the course of the computations, no entity is able to obtain the decryption key $key_i^{-1}$, and also no entity is able to obtain the pseudonym mapping key b, i.e. no entity is able to generate a pseudonym from unencrypted data in secret, i.e. to compile a rainbow table. The solution also ensures that in case of a particular mapping the execution order of the mappings performed by the mappers cannot be established in advance, thereby it is made more difficult for the participating entities to successfully cooperate with the aim of cracking the system. To provide for that, information technology methods based on known number theoretical bases are applied, including means disclosed in relation to the protocols applied by blockchain technology.

BRIEF DESCRIPTION OF THE DRAWINGS

Preferred embodiments of the invention are described hereinafter by way of example with reference to the following drawings, where.

MODES FOR CARRYING OUT THE INVENTION

Figure 1:
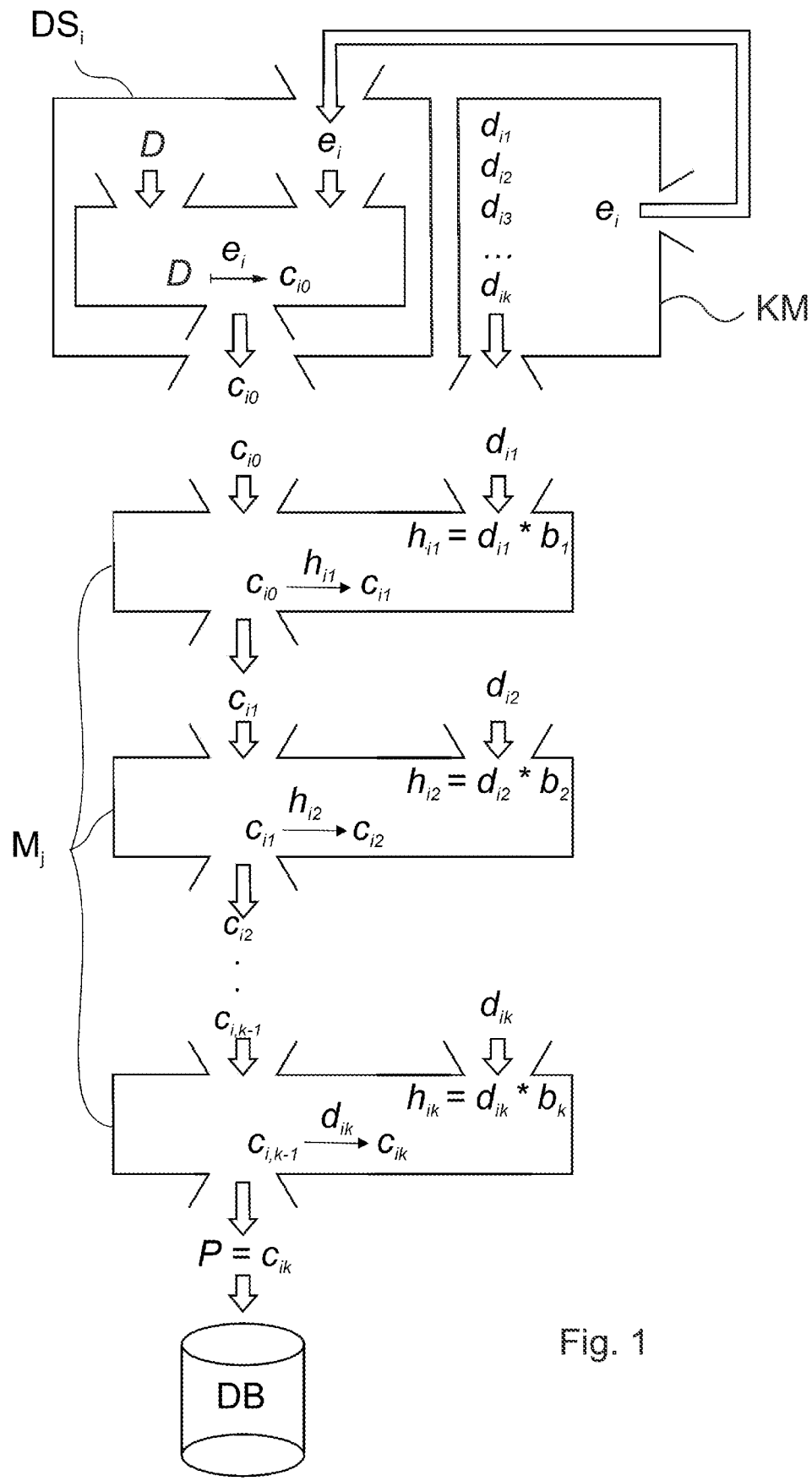
FIG. 1 is a schematic diagram of a solution according to the invention implemented applying a key manager.

According to the invention it has been recognised that the characteristics of algebraic structures constituting multiplicative or additive cyclic groups can be preferably utilized to fulfil the objects of the invention. Two types of solutions based on such algebraic structures are described below in more detail, but, according to the invention, other such algebraic structures that provide the arithmetic required for the operation of the invention can also be applied. Of the exemplary algebraic structures, a solution involving residue classes modulo N (where N is a positive integer) is first described in detail, followed by describing, in relation to the former, a solution involving points of elliptic curves defined over the number field of residue classes modulo p (where p is a prime).

The entity identifiers and corresponding data are stored in databases at mutually independent data sources, and, after pseudonymisation according to the invention, the data, together with the pseudonyms generated from the entity identifiers, are stored, assigned to each other, in a central pseudonymised database. Complying with the conditions of the object set for the invention, for a given entity identifier, the relationship between unencrypted data and the pseudonym cannot be affected by the origin of the data (i.e. what data source it came from). However, the process of mappings, i.e. the operations performed at the particular stages, are unique for each data source, that is, different cryptographic keys (for example, modular exponents) have to be used for performing the same mapping. Apparently, the range of a mapping preceding another one in the sequence cannot be greater than the domain of the latter. For residue classes this implies that the value of the modulus cannot be decreased during the process. Since the order of the mappings depends on the mapped data and on the applied key, i.e. is different each time, this condition can only be fulfilled by applying a constant modulus. Therefore, the implementation of a data gathering system necessarily begins with selecting an appropriate modulus. This is carried out in practice by the provider of the data gathering service, or the data gathering community first deciding upon the bit length of the applicable keys. Then, two such prime numbers are selected of which the product (applied as the modulus) can be represented using the given number of bits. The entity or entities generating the keys (for example the key manager or the data sources) have to know the modulus N and also its value φ(N) given by the Euler function, or in other words, its totient value. The value N of the modulus has to be known by all participants performing mappings. If the representation size of the entity identifiers to be mapped is significantly smaller than the key size, some kind of padding method is preferably applied. This method has to be deterministic in the sense that every data source has to receive the same value such that the pseudonym is also deterministic, irrespective of the data source. The basic data of the mapping are therefore N and φ(N).

According to the invention, by random selection it is meant that the implementation of the method is not dependent on which particular elements of the given set are chosen. Accordingly, random selection is meant to include also quasi-random or pseudo-random selection, as well as all such selection methods (even according to rules unknown to an observer) wherein the selection appears to be random to the outside observer. If the set constitutes an algebraic structure, then, if it has a null element and/or a unit element, then it/they are not regarded as randomly selected. Also, in the case of residue classes, the selection of non-relatively prime values is avoided. However, for cryptography considerations it is worth selecting values for which the bit length of their representation fills up all the available space.

Figure 2:
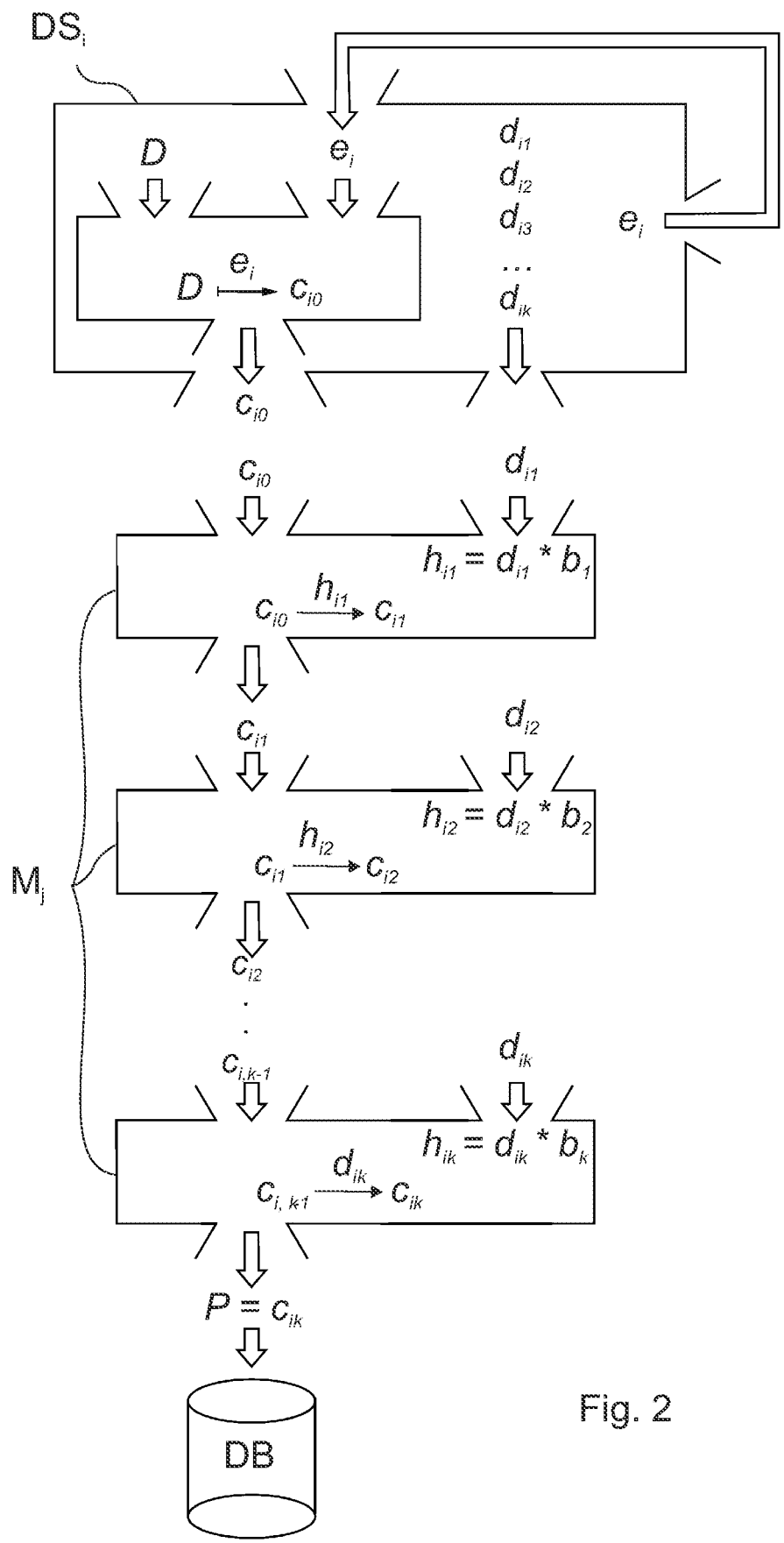
FIG. 2 is a schematic diagram of a solution according to the invention implemented without a key manager.

As can be seen in FIGS. 1 and 2, entity identifiers D and attributes (the latter are not shown in the diagram) describing the entities or their behaviour are stored by data sources $DS_i$ in their respective own databases. The relationship between a particular entity and the other entities can be regarded as a characteristics of the given entity. Thus, in such a relation the entity identifiers of the other entities are regarded as attributes (for example, B is a client of A, in which case B is an attribute and an entity identifier at the same time). Because the aim of the technical solution according to the invention is supporting anonymity, such data can also be regarded as an entity identifier.

The attributes related to the entity identifiers D are preferably passed on by the data sources $DS_i$ as unencrypted data, while the entity identifiers D are encrypted by the data sources $DS_i$ utilizing their own cryptographic keys. The resulting cipher is sent to the entities adapted to perform the mapping to the pseudonym P, i.e. to the mappers $M_j$. At the same time, an assignment between the unencrypted data and the cipher, i.e. the encrypted entity identifier is maintained, because the database required for data analysis can only be loaded with useful information in such a manner.

For the security of the pseudonym mapping it is crucial that no entity is able to carry out the operation by itself, i.e. no one is able to generate a pseudonym from unencrypted data. This is possible only if no entity possesses the value of the below described exponent b that, together with the modulus N known by everyone, is sufficient for mapping an unencrypted value to a pseudonym: $P \equiv D^b \bmod N$.

The above condition can be fulfilled only in case b is not computed. Because we are dealing with an exponent of modular exponentiation over residue classes, the operation can also be performed utilizing the multiplicative factors of b. If $b = b_1 \cdot b_2 \cdot \ldots \cdot b_k$, then $$P \equiv D^{b_1 \cdot b_2 \cdot \ldots \cdot b_k \bmod \varphi(N)} \bmod N \equiv D^b \bmod N$$

If the system comprises a number k of mappers, then each may generate a factor for b that is relatively prime to φ(N). If φ(N) is not known to them, then they choose a prime number. Thereby, they can carry out the above mapping only collectively. In order to do that, it is not necessary to share the factors $b_j$ among them. What is required is that each mapper performs a modular exponentiation exactly once (in an arbitrary order), utilizing its own factor:

$$P \equiv \left(\left(\left(D_i^{b_{j1}}\right)^{b_{j2}}\right)^{\cdots}\right)^{b_{jk}} \bmod N \equiv D^{b_{j1} \cdot b_{j2} \cdot \ldots \cdot b_{jk}} \bmod N$$

where the indices $j_p \in \{1 \ldots k\}$ stand for an arbitrary (arbitrary-order) permutation of the factors of b.

The cryptographic keys $e_i$ of the data sources $DS_i$ and the decryption factors are generated as follows. The pseudonym has to be computed by the mappers $M_j$ not from unencrypted data, but from the cipher computed by the data sources $DS_i$. If the product b of the exponent factors was available, then the cipher $$C_i \equiv D^{e_i} \bmod N$$

received from the i-th data source would be used above for the following calculation:

$$P \equiv ((C_i)^{d_i} \bmod N)^b \bmod N$$

Because according to a basic idea of the invention more than one (i.e. a number k of) mappers are applied, the same method is applied as for the exponent b: let us generate $d_i$ as a modular product having a number of factors equalling the number k of the mappers $M_j$ (since modular exponents are applied, here the modulus is φ(N)). In the case of the i-th data source, key generation begins with generating the factors of the exponent $d_i$: $d_i = d_{i1} \cdot d_{i2} \cdot \ldots \cdot d_{ik}$ (the first index identifies the cryptographic key of the data source, and the second identifies the mapper) that are randomly selected by the data source and that each are relatively primes to φ(N). Then the extended Euclidean algorithm is applied for computing $e_i$, for which the formula $e_i d_i \equiv 1 \bmod \varphi(N)$ will hold true, i.e. $e_i$ will be the inverse cryptographic key of the product. The number of the elements $d_{ij}$ or factors, equals the number k of mappers, so they have to be passed on—applying any known method—to the mappers $M_j$ in encrypted form. Utilizing an element $b_j$ randomly selected from the algebraic structure and kept secret, each mapper computes the pseudonym mapping exponent $h_{ij} \equiv b_j \cdot d_{ij} \bmod \varphi(N)$ corresponding to the i-th cryptographic key, i.e. the mapping cryptographic key $h_{ij}$ of the mapper $M_j$ corresponding to the data source $DS_i$. Since φ(N) is unknown to the mappers $M_j$, they cannot perform normalization according to the modulus φ(N). As a result of this, the (maximum) size of the exponent will be twice the key size (because it is obtained as the product of two numbers that can each be represented utilizing the given key size), which does not pose any practical problems, because it represents the same residue class as would have been the result of normalization.

As an initial step of mapping the pseudonym P, the cipher $C_i \equiv D^{e_i} \bmod N$ is passed on by the i-th data source to the mapper $M_j$. The mapping process starts at this step. Before the first computational step, the initial value is the cipher of the data source that is denoted in the index $C_{i0}=C_i$, which corresponds to the encrypted entity identifier $C_{i0}$ of the entity identifier D to be mapped. When, following the k-th step, all the mappers have already executed the modular exponentiation operation $C_{i,s+1}=C_{i,s}^{h_{ij}} \bmod N$ applying its own exponent, the pseudonym $C_{ik}=P$ is obtained, because $$\left(\left(\left(C_i^{h_{i1}}\right)^{h_{i2}}\right)^{\cdots}\right)^{h_{ik}} \bmod N \equiv C_i^{\prod_{j=1}^{k} h_{ij} \bmod \varphi(N)} \bmod N \equiv C_i^h \bmod N \equiv P$$

where the order of the exponents $h_{ij}$ is arbitrary. Of course, in a concrete implementation the sequence order has to be determined somehow; it can be random, quasi-random, or deterministic. The pseudonym P is therefore generated by sequentially performing, on each encrypted entity identifier $C_{i0}$ encrypted by the data sources $DS_i$, a number k of mappings in a permutation of the mappers $M_j$ utilizing the mapping cryptographic keys $h_{ij}$ of the mappers $M_j$ corresponding to the data sources $DS_i$. The solution according to the above formula is also preferable because the representation size does not increase in the course of the calculations, since the result of the exponentiation is normalised by way of the modular operation.

Therefore, such a key system was provided above that also fulfils requirements (3) and (4) above set for pseudonym generation, because for carrying out a mapping the cooperation of a data source and all of the mappers is required. For the same reason it is also impossible to mount an undetected rainbow-table attack, because it is sufficient if one of the mappers detects the initiation of hundreds of millions or billions of mapping processes. In such a case, the mappers not engaged in the cracking operation deny to perform mappings of the messages encrypted with the key having the given index.

To provide a concrete implementation of the above described idea, the roles of and the mode of cooperation between the different entities, i.e. the data sources $DS_i$, the mappers $M_j$ and the optionally included key manager KM have to be established.

With the solution based on residue classes, that is, in the case wherein the entity identifiers D and the pseudonyms P are represented by residue classes modulo N, $\varphi(N)$ has to be kept secret, because an entity possessing it can compute the inverse exponents, i.e. the inverse keys. In this solution, however, the inverse of the particular exponent factors does not yield the inverse of the encryption mapping, so it does not pose a danger if it is computed. The application of a key manager KM is therefore optional for implementing the system.

An exemplary solution including a key manager KM that can be seen in FIG. 1 comprises the following steps:

(1) the constants of the mapping are generated by the key manager KM: $N=p \cdot q$, $\varphi(N)=(p-1) \cdot (q-1)$ (both factors are randomly selected prime numbers that can preferably be represented in half the bit length of the chosen key size), of which N is made public to the other entities and $\varphi(N)$ is kept secret;

(2) the secret elements $b_j$, i.e. in this embodiment, the exponents, are generated by the mappers $M_j$—because the elements have to be relatively prime to $\varphi(N)$ that is unknown to the mappers $M_j$, randomly chosen primes are selected, for which the condition is trivially fulfilled;

(3) upon the request of a data source $DS_i$, the key manager generates a cryptographic key $e_i$ with an identifier i for the applicant, and also generates the corresponding elements $d_{i1}, \ldots, d_{ik}$, i.e. the exponent factors of the mapping for the number k of mappers $M_j$ according to the conditions specified in the above description; the keys are identified by a respective index to keep them assigned to the data sources; the data have to be kept secret so they have to be passed on in an encrypted manner;

(4) the values $h_{ij} \equiv d_{ij} \cdot b_j$ are computed by the mappers $M_j$ and are kept secret; because $\varphi(N)$— is not known to them, this exponent can be represented in double the bit length of the key size because this way the residue class cannot be represented applying the least positive integer;

(5) the entity identifier D, i.e. the unencrypted data is mapped by the data source into the cipher $C_{i0} \equiv D^{e_i} \bmod N$ and is sent to the mappers $M_j$;

(6) in an agreed-upon order, the value $C_{i,s+1}=C_{i,s}^{h_{ij}} \bmod N$ is computed, from (s=0) to (s=k-1), by the mappers $M_j$ such that the result $C_{ik}$ of the last mapping will become the pseudonym P.

In the above described embodiment, the data are encrypted by the data sources $DS_i$ applying respective own secret cryptographic keys $e_i$ identified by the index i, where a data source $DS_i$ can have an arbitrary number of keys that are mapped into the pseudonym P by the cooperation of a plurality (a number k) of mappers $M_j$ identified by the index j ($j \in \{1 \ldots k\}$).

It is particularly preferable to choose prime numbers as the values p and q, because in that case the number of relative primes is known (it is $(p-1) \cdot (q-1)$).

The exemplary implementation without a key manager that can be seen in FIG. 2 comprises the following steps (here the tasks of the key manager are preferably performed by the data source $DS_i$).

(1) the constants of the pseudonym mapping are generated either by a provider, or, consensually, by the participating entities: $N=p \cdot q$, $\varphi(N)=(p-1) \cdot (q-1)$ (both factors are randomly selected prime numbers that can preferably be represented in half the bit length of the chosen key size), it is not necessary to keep these data secret;

(2) the secret elements $b_j$, i.e. the exponents, are selected randomly by the mappers $M_j$, because the exponents are relatively prime to $\varphi(N)$ that is known to the mappers, in this case it is not necessary to select prime numbers;

(3) each data source $DS_i$ is adapted for generating an arbitrary number of keys; in this case it is expedient to choose the hash code of the elements or factors of the cipher exponent $e_i$ and the elements $d_{i1}, \ldots, d_{ik}$ of the decryption exponent as the key identifier (after generating the factors) so that no central coordination for ensuring uniqueness is necessary; the key is generated as follows: the elements $d_{i1}, \ldots, d_{ik}$ or factors—which are relatively prime to $\varphi(N)$, and of which the modular product $d_i$ calculated for the modulus $\varphi(N)$, as a value derived from the aggregate of the elements, will be the exponent $d_i$ of the decryption key—are selected randomly by the data source; this is followed by finding the multiplicative inverse of $d_i$ for the same modulus, whereby $e_i$ is obtained. The elements or factors $d_{i1}, \ldots, d_{ik}$ are sent in encrypted form (for example, are uploaded to a blockchain) to the mapper $M_j$ corresponding to the particular index; if a blockchain is applied, the cryptographic key can be the public key of the mapper's wallet;

(4) the value $h_{ij} \equiv d_{ij} \cdot b_j \mod \varphi(N)$ is computed by the mappers $M_j$ and is kept secret;

(5) the entity identifier D, i.e. the unencrypted data is mapped by the data source $DS_i$ into the cipher $C_{i0} \equiv D^{e_i} \mod N$ and is shared with the mappers $M_j$, preferably by writing it into a database that operates according to a protocol verified by third parties and provides decentralized authenticity (practically, into a blockchain);

(6) A) in an agreed-upon order, the mappers compute the value $C_{i,s+1}^{(j)} = C_{i,s}^{h_{ij}} \mod N$, where i denotes the cryptographic key of the data source, s the step number of the mapping, and j the identifier of the mapper; the result $C_{ik}$ of the last mapping will become the pseudonym P; if the mappers are the nodes of a "permissioned" blockchain, then the result of the mapper j that is entitled to close the following block according to the blockchain consensus protocol is written into the next block ($C_{i,s+1} = C_{i,s+1}^{(j)}$); no further operation is performed by this node in the further course of the mapping (the exponent factor $h_{ij}$ can be use utilized exactly once by each entity in the mapping sequence); thereby, one less of the values $C_{i,s+1}^{(j)}$ are generated in each step, and only one in the last step;

B) in the case of a public blockchain, the results $C_{i,s+1}^{(j)}$ are uploaded by the mappers into the blockchain during each transaction, followed by continuing the computation utilizing a value $C_{i,s+1}$ according to a predetermined rule; such a rule can for example be that the modulo-N sum of the values $C_{i,s+1}^{(j)}$ are computed, and then the value $C_{i,s+1}$ applied for the further computation will be the value that is arithmetically closest thereto; in such a case, in order that each exponent factor $h_{ij}$ is utilized only once for computing the result, the mapper whose value has already been selected does not take part in further computations; the result $C_{ik}$ of the last mapping will become the pseudonym P; if a public blockchain is applied, it has to be guaranteed that the data source that is in possession of the unencrypted data is not able to track the chain of computations so that it cannot connect the data with the computed pseudonym.

During computing the pseudonym P, the values $C_{i,s+1}^{(j)} = C_{i,s}^{h_{ij}} \mod N$ are computed by the mappers $M_j$, from which the value $C_{i,s+1}$, to be utilized as the input value of the subsequent computation step, is chosen by a program (for example, a blockchain smart contract) operating according to a verified protocol utilizing a deterministic method. Each mapping exponent has to be used only once in a mapping, with only those mappers $M_j$ performing a calculation in the following steps of which the result has not yet been selected (as of the current state of the process) as the input of the subsequent mapping. With a number k of mappers, the process is concluded by computing the pseudonym P in the k-th step ($P \equiv C_{ik}$).

Figure 3:
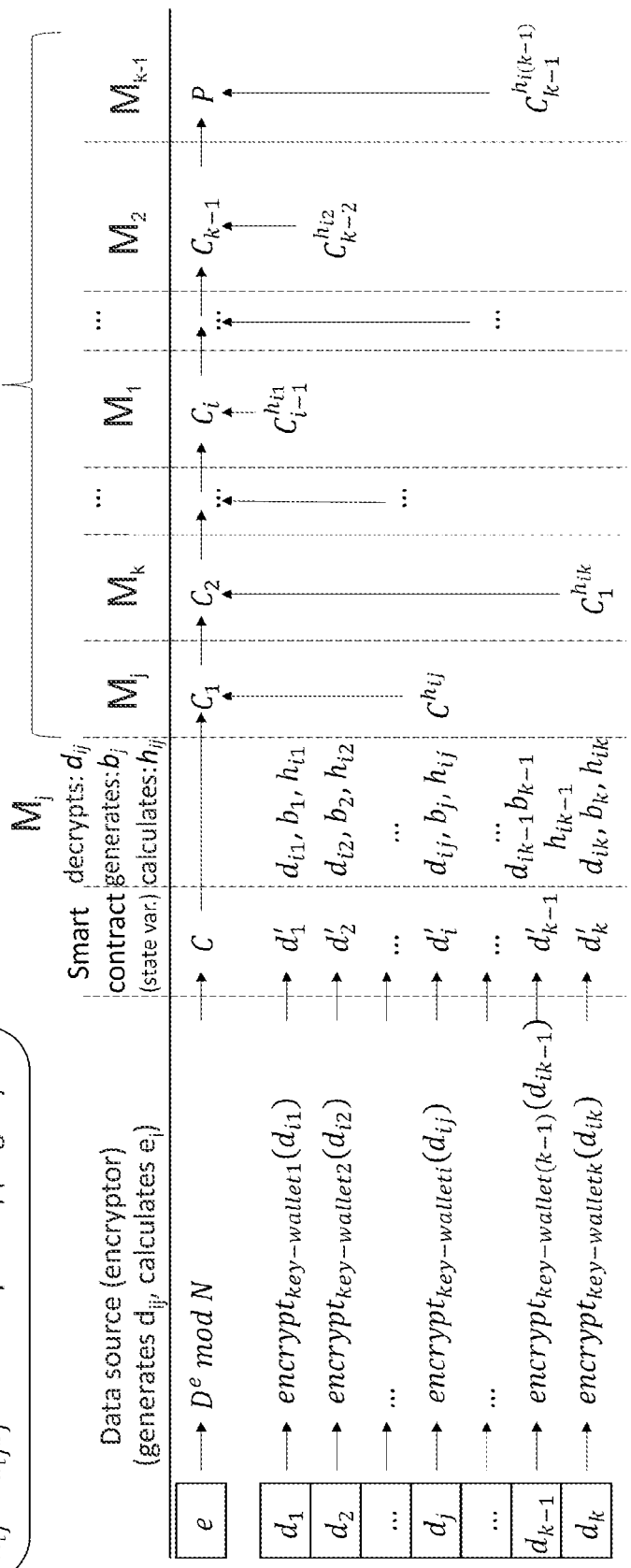
FIG. 3 is a table schematically illustrating an exemplary pseudonym mapping process.

FIG. 3 illustrates how the mapping is performed according to a permutation with a given order; the steps and other information shown in the diagram are to be interpreted as per the description above.

In FIGS. 1 and 2, therefore, two conceptually different solutions are illustrated.

(1) A key manager KM and a plurality of mappers $M_j$ are applied, wherein the key applied for mapping the unencrypted data into the pseudonym P is generated utilizing exponent factors, the key manager KM generating the required pair of cryptographic keys such that the exponent of the decryption key is generated factor-by-factor.

(2) The cryptographic keys are generated by the data sources $DS_i$ such that the exponent of the decryption key is generated factor-by-factor. The key applied for mapping the unencrypted data into the pseudonym P is generated by the plurality of mappers $M_j$ applying exponent factors, there is no key manager.

As it was mentioned in the introduction, pseudonym mapping can also be performed applying points of elliptic curves (see for example the Wikipedia article "Elliptic curve") defined over the number field of residue classes modulo p (where p is a prime). In this context, let the algebraic structure be the set of points satisfying the equation $y^2 = x^3 + Ax + B \mod p$, where x, y, A and B are the residue classes of the prime number p. First, the unencrypted entity identifier m has to be assigned to a point of the curve. Let us choose a point G of the curve having an order q that is sufficiently great that the points of the message space can be assigned to the points generated by G applying a one-to-one mapping. (For all points of the curve there is a number q being the number of additions to itself of the point required for reaching the point O at infinity. The smallest of such numbers q gives the order of the point.) To achieve that, for example the following method can be applied (Aritro Sengupta, Utpal Kumar Ray: Message mapping and reverse mapping in elliptic curve cryptosystem (2016)). At the low order digits the binary representation of D is complemented by 8 bits. In the above defined formula of the curve, x is substituted with the value thus obtained. If no solution exists for y, then the value of x is increased by one. If a solution does exist, then a point M of the finite algebraic structure defined by the curve has been obtained. The description related to the specification of the objects above is applied here such that this point is projected by the i-th data source $DS_i$ to another point $C_i$ of the curves applying its own cryptographic key, followed by it being projected by the mappers to the point P utilized as a pseudonym such that the different ciphers $C_i$ are assigned to the same point P if and only if the point M was identical.

Because the solution based on algebraic structures forming an additive cyclic group operates in an analogous manner to the solution based on a multiplicative cyclic group, it is not shown separately. The references shown in the figures can be substituted, where needed, with the corresponding operations and references included in the following description. The values x, y, A, B and p adapted to define the algebraic structure are defined by the entity providing the pseudonym mapping service that also selects the point G with a known order greater than the multiplicity of the message space. The entity then shares the data with the data sources and the mappers. A respective secret key $b_j$, j=1 . . . k is chosen randomly by each of the number k of mappers from the residue classes of mod q, selecting values different from 1 and 0. The sum of these values is denoted by $b = \sum_{j=1}^{k} b_j$.

For data provision, as many elements $a_{ij}$ (i.e., numbers) as the number k of mappers are randomly selected from the residue classes of q by the i-th data source, the sum $a_i$ of the elements will be the own cryptographic key $e_i = a_i = \sum_{j=1}^{k} a_{ij}$ thereof. This key is passed on in an encrypted form to the mapper with the appropriate index, and the latter then computes the mapping key corresponding to the data source applying the formula $h_{ij} = a_{ij} + b_j$. In the case of a blockchain system, the public portion of the signing key of the mapper can be utilized for the encryption.

After that, the encryption operation is performed by the data source $DS_i$ by adding two points: $C_{i0} = M \oplus a_i G$, where the operator $\oplus$ denotes the addition of two points of the curve, and scalar multiplication denotes repeated addition. The above process carried out on residue classes is modified only in that the below described operation is performed on the points of the curve. In the s-th step the following operation is performed by the mapper with the index j on the data originating from the i-th data source: $C_{i,s+1}^{(j)} = C_{i,s} \oplus (-h_{ij}G)$, where the unary operator "−" denotes the reflection of a curve point over the x axis. The operation $\oplus$ utilizing such values are hereinafter denoted with the operator $\ominus$. Thus, performing a complete sequence of mappings, the pseudonym is obtained as a result of the following operations:

$$P = M \oplus a_i G \ominus h_{i1} G \ominus \ldots \ominus h_{ik}$$

$$G = M \oplus a_i G \ominus (a_{i1} + b_1 + \ldots + a_{ik} + b_k)$$

$$G = M \oplus \left(a_i - \left(\sum_{j=1}^{k} a_{ij} + \sum_{j=1}^{k} b_k\right)\right)$$

$$G = M \oplus (a_i - a_i)G \ominus bG = M \ominus bG$$

Thus, the same entity identifier D is sent by each data source as a different cipher, but finally it is assigned to the same pseudonym P. Optionally, the x coordinate of the point P can also be applied as the pseudonym.

For computing the pseudonym P, the values $C_{i,s+1}^{(j)} = C_{i,s} \ominus h_{ij}G$ are therefore computed by the mappers $M_j$ from (s=0) to (s=k−1), where $A \ominus B = A \oplus (-B)$, from which the value $C_{i,s+1}$, to be utilized as the input value of the subsequent computation step, is selected by a program (for example, a blockchain smart contract) operating according to a verified protocol utilizing a deterministic method. Each mapping key has to be used only once in a mapping. In the next step, only those mappers $M_j$ perform a calculation of which the result has not yet been selected (as of the current state of the process) as the input of the subsequent mapping. With a number k of mappers, the process ends by computing the pseudonym P in the k-th step ($P = C_{ik}$).

If a key manager KM is to be utilized, then this entity is applied for generating, i.e. for randomly selecting, the addends of $a_i$.

Therefore, in order to ensure that possessing any component of the system is not sufficient to allow for deciphering the relationship between the pseudonym P and the entity identifier D, the following data conversion is performed by the pseudonym mapping system according to the invention:

producing from data that are available at data sources $DS_i$ and that are suitable for identifying persons, things or other entities by a characteristic name, i.e. from the entity identifier D, such pseudonymised data, in which the entity identifiers D are replaced by a pseudonym P assigned thereto in a one-to-one manner independent of the cryptographic key $e_i$ utilized by the data source $DS_i$, such that as many elements $d_{ij}$, $a_{ij}$ are chosen randomly, by the data sources $DS_i$ applying an encryption means/module, from an algebraic structure forming a multiplicative or additive cyclic group utilized by the cryptographic algorithm, as the number of the mappers $M_j$ (preferably, here the following functionality is implemented by the encryption means/module: it generates a random number which can be mapped into the key space applying a suitable mapping in order to select from among the elements of the key space with a near-uniform probability, i.e. randomly), of which elements the inverse cryptographic key is computed—depending on the structure, utilizing their product or their sum—and is utilized as their own, unique encryption key $e_i$ for encrypting their respective entity identifiers D, and these ciphers (or encrypted data) are mapped into respective pseudonyms by a plurality of encryption means called mappers $M_j$, the mapping being performed by the mappers $M_j$ in a centralized system or in a decentralized (peer-to-peer, e.g. blockchain) network applying their respective own unique mapping cryptographic keys $h_{ij}$, executing their own operation in an arbitrary sequence order, such that for computing each unique mapping cryptographic key $h_{ij}$, a single one of the elements $d_{ij}$ passed on by the data source $DS_i$, and a data element that is randomly selected by the mapper itself from the applied algebraic structure and is kept secret, are applied.

The computer system for cryptographic pseudonymisation according to the invention comprises data sources $DS_i$ containing data related to entities, the data being identified at the data sources $DS_i$ by the entity identifiers D of the entities, a pseudonymised database DB wherein the data are identified by respective pseudonyms P assigned, in a one-to-one manner, to each of the entity identifiers D, a number k (i.e. more than one) of mappers $M_j$, optionally, a key manager KM, and modules implementing the above described functions and/or entities, which modules can be hardware, software, or combined hardware-software modules.

The key manager KM is preferably an apparatus comprising a processor adapted for executing a program and memory adapted for providing data writing, storage, and read-out functions. The program run on the apparatus is adapted to generate the data required for executing the mappings, for example the modular exponent adapted for generating a pseudonym from unencrypted data and the totient value of the modulus. The apparatus is adapted for storing these values such that they cannot be accessed by anybody else, but it can still be capable of performing computations utilizing them. In addition to that, it is also capable of computing modular exponent key pairs applying the above described process, for example the extended Euclidean algorithm, and of passing on the encrypted exponent to the data source over a secure data channel and computing the exponent applied for pseudonym mapping, which latter it can also pass on to the entity performing the mapping over a secure data channel. All these requirements are fulfilled for example by the above-mentioned Trusted Platform Module (TPM) circuits.

The mapper $M_j$ is preferably an apparatus that is adapted for reading any input parameters of modular exponentiation (base, exponent, modulus), as well as executing the operation and making the result available for readout. The mapper apparatus has to comprise a module adapted for random number generation. Such a module can for example be implemented as a general-purpose computer or microcontroller. TPM circuits also fulfil all the above listed requirements.

Another aspect of the invention is a computer program comprising instructions which, when the program is executed by a computer, cause the computer to carry out the steps of the method according to the invention. The invention further relates to a computer-readable medium adapted for storing the above-mentioned computer program.

The invention can be applied for various purposes; one of these being the analysis of loyalty card purchase databases involving multiple stores. Let us assume that a company engaged in business analysis and market research activities prepares an analysis of typical customer behaviour in retail stores, which is then purchased by its clients. The analysis is aimed at defining customer groups based on characteristics like the products purchased, the frequency of purchases, the relationship between type and location of stores, the season of year, and the products purchased, etc.

In order to prepare the analysis, the company needs data. In addition to using publicly available statistical data, such companies often seek to motivate retailer chains and individual stores into cooperating with them. To facilitate that, they for example share part of their research results with the retailers so that they can improve the efficacy of their advertising and improve their selection of products. In many store purchase transactions, none of the characteristics of the customer are known. Although the data included in the receipt can be utilized, the only extra information it provides compared to product sale statistics is that it includes information on products sold during a single purchase transaction and the exact time and date thereof. At the same time, the stores can also offer loyalty card programs. Customers are offered various discounts for taking part in such programs. In the case of such purchases, personal information on the customer and other data thereof relevant for analytic purposes are known. Such data have been passed on (in varying detail) to market research companies by some of the stores (data sources), however, due to a change in legislation related to protecting personal data, this practice will soon end. So, the most important product of the market research company, the "retail market report" has become jeopardized. The regulation on personal data protection makes the above business impossible, although analysing the behaviour of customer groups does not require the possession of concrete personal data of any of the customers.

If those pieces of data that are applicable for personal identification are simply removed from the data passed on by the stores (except for, possibly, sex, age and postcode) then more valuable results can be obtained compared to those based on purchase receipts, but the information related to particular purchases of a given (anonymous) person at a given store is lost, although possessing and processing such information is not legally prohibited. The stores have therefore committed to use a made-up identifier, i.e. a pseudonym for the identification of the purchases of a given customer. This further improves analysability, but this way a customer who made purchases in different stores will be treated as multiple different persons if the mode of pseudonymization is not uniform.

The idea may arise that a mapping implemented utilizing a so-called "salted" cryptographic hash function can be applied to the personal data (such as name, sex, birth date, and postcode), but certain lawyers representing the stores may reject this option because the resulting hash data can be connected, by the entity performing the data analysis, to the personal data simply by registering itself as a store and compiling a rainbow table for example from the electoral register. The invention provides a solution to this problem. The implementation of the solution according to the invention can comprise a server software component that allows that the data sources $DS_i$ generate and store their key on their own computer by visiting a web page (after authentication). The computations to performed by the mappers $M_j$ and the program supporting communication with the blockchain system can be written for a cloud environment. The service can be activated at various different cloud service providers such that its operation cannot be affected (except for starting and stopping it) by any of the entities; this setup can preferably also be audited. Utilizing the client software belonging to the web page, the distribution of the key factors is passed on by the stores to the mappers Mi, the stores then uploading the data to the blockchain (after encrypting them utilizing the key stored at them), where the pseudonym is generated as a result of the mapping sequence.

Thereby, the ciphers generated individually by the different stores are mapped into the same value by the entire computational chain. Also, the application of blockchain technology makes it impossible to compile a rainbow table that would be applicable for restoring the relationship between the unencrypted data and the pseudonym P.

Thus, the analyses can be applied for picking out customers who typically make their purchases in a given store but usually buy a particular product somewhere else, or on certain days do their shopping at a different location shortly after store closure. These are valuable pieces of information that can support business decisions. For example, it is preferable to stock another brand of a particular product, or to close an hour later on Fridays.

LIST OF REFERENCE SIGNS

D entity identifier
P pseudonym
$DS_i$ data sources
$M_j$ mappers
KM key manager
$d_{ij}$ elements (inverse key factors in a multiplicative structure)
$d_i$ modular product of elements
$e_i$ cryptographic keys (in a multiplicative structure)
$a_{ij}$ elements (cryptographic key addends in an additive algebraic structure)
$a_i$ sum
$b_j$ secret element (factor or addend of own mapping cryptographic key)
$C_{i0}$ encrypted entity identifier
$h_{ij}$ mapping cryptographic keys
DB database

The invention claimed is:

1. A cryptographic pseudonym mapping method for an anonymous data sharing system, the method being adapted for generating a pseudonymised database (DB) from data relating to entities and originating from data sources ($DS_i$), wherein the data are identified at the data sources (DS) by entity identifiers (D) of the respective entities, and wherein the data are identified in the pseudonymised database (DB) by pseudonyms (P),
characterized in that
the pseudonyms (P) are assigned to the respective entity identifiers (D) applying a one-to-one mapping, irrespective of the originating data source, by
applying more than one, a number k of mappers ($M_j$), selecting, for each data source ($DS_i$), elements ($d_{ij}$, $a_{ij}$) in a number equal to the number of mappers ($M_j$) from a predetermined algebraic structure constituting a multiplicative or an additive cyclic group, of which elements ($d_{ij}$, $a_{ij}$) one element ($d_{ij}$, $a_{ij}$) is sent, while being kept secret and kept assigned to the data source ($DS_i$), to each mapper ($M_j$), calculating from the plurality of elements ($d_{ij}$, $a_{ij}$) an inverse cryptographic key of said plurality, and transforming, each entity identifier (D) to be mapped, into a respective encrypted entity identifier ($C_{i0}$) by using the inverse cryptographic key as an own secret cryptographic key ($e_i$) of the data source ($DS_i$), generating for each mapper ($M_j$) its mapping cryptographic key ($h_{ij}$) corresponding to the data source ($DS_i$) by using the element ($d_{ij}$, $a_{ij}$) that was sent to the mapper ($M_j$) and an element ($b_j$) selected randomly from the algebraic structure and kept secret by the mapper ($M_j$), and generating respective pseudonyms (P) by sequentially performing, in a permutation of the mappers ($M_j$), a number k of mappings utilizing the mapping cryptographic keys ($h_{ij}$) of the mappers ($M_j$) belonging to the particular data source ($DS_i$) on each encrypted entity identifier ($C_{i0}$) encrypted by the data source ($DS_i$), further characterised by applying an algebraic structure constituting a multiplicative cyclic group, wherein values are represented by residue classes modulo N, for which algebraic structure constants N=p·q and φ(N)= (p−1)·(q−1) are predetermined, where p and q are randomly selected prime numbers, and φ(N) is the value of the Euler function obtained for N, for generating the own cryptographic key ($e_i$) of each data source ($DS_i$), randomly selected factors that are relatively primes to the modulus φ(N) are generated as elements ($d_{ij}$) in a number corresponding to the number of the mappers ($M_j$), the multiplicative inverse for φ(N) taken as a modulus of the modulo product ($d_i$) of the randomly selected factors is obtained in a manner known per se, and said multiplicative inverse value is chosen as the own cryptographic key ($e_i$) of the data source ($DS_i$), for which value the formula $e_i d_i = 1 \mod \varphi(N)$ holds true, the elements ($d_{ij}$) are sent encrypted to the mappers ($M_j$), the mappers ($M_j$) are applied for decrypting their respective own elements ($d_{ij}$), and the mapping cryptographic key ($h_{ij}$) of each mapper ($M_j$) corresponding to the data source ($DS_i$) is generated applying the formula $h_{ij} = d_{ij} b_j \mod \varphi(N)$, where the randomly selected secret element ($b_j$) is relatively prime to φ(N), the encrypted entity identifier ($C_{i0}$) is computed by the data source ($DS_i$) utilizing the formula $C_{i0} = D^{*i} \mod N$, and the sequential mappings of the mappers ($M_j$) are performed, from (s=0) to (s=k−1) applying the formula $C_{i,a+1}^{(j)} = C_{i,1}^{h_{ij}} \mod N$, where $P = C_{ik}$.

2. The method of claim 1, characterised in that the randomly selected prime numbers p and q can be represented utilizing half the number of bits of a chosen key size.

3. The method of claim 1, characterised in that the encrypted entity identifier ($C_{i0}$) is shared with the mappers ($M_j$) by writing it into a database that operates according to a protocol verified by third parties and provides decentralized authenticity.

4. The method of claim 1, characterised in that a blockchain database is applied as the database providing decentralized authenticity.

5. The method of claim 1, characterised in that the constants N and φ(N) of the algebraic structure are generated by a key manager (KM), of which φ(N) is kept secret, and the own cryptographic key ($e_i$) of the data source ($DS_i$) and the elements ($d_{ij}$) corresponding thereto are generated by the key manager (KM) and are sent encrypted to the data source ($DS_i$) and to the mappers ($M_j$), wherein a prime number is chosen as randomly selected secret element ($b_j$).

6. A computing device comprising:
a memory; and
a processor, operatively coupled to the memory, to carry out the steps of the method of claim 1.

7. A non-transitory computer-readable medium storing instructions, the instructions comprising one or more instructions that, when executed by a processor, cause the processor to carry out the steps of the method of claim 1.

8. A cryptographic pseudonym mapping method for an anonymous data sharing system, the method being adapted for generating a pseudonymised database (DB) from data relating to entities and originating from data sources ($DS_i$), wherein the data are identified at the data sources ($DS_i$) by entity identifiers (D) of the respective entities, and wherein the data are identified in the pseudonymised database (DB) by pseudonyms (P), characterized in that the pseudonyms (P) are assigned to the respective entity identifiers (D) applying a one-to-one mapping, irrespective of the originating data source, by applying more than one, a number k of mappers ($M_j$), selecting, for each data source ($DS_i$), elements ($d_{ij}$, $a_{ij}$) in a number equal to the number of mappers ($M_j$) from a predetermined algebraic structure constituting a multiplicative or an additive cyclic group, of which elements ($d_{ij}$, $a_{ij}$) one element ($d_{ij}$, $a_{ij}$) is sent, while being kept secret and kept assigned to the data source ($DS_i$), to each mapper ($M_j$), calculating from the plurality of elements ($d_{ij}$, $a_{ij}$) an inverse cryptographic key of said plurality, and transforming, each entity identifier (D) to be mapped, into a respective encrypted entity identifier ($C_{i0}$) by using the inverse cryptographic key as an own secret cryptographic key ($e_i$) of the data source ($DS_i$), generating for each mapper ($M_j$) its mapping cryptographic key ($h_{ij}$) corresponding to the data source ($DS_i$) by using the element ($d_{ij}$, $a_{ij}$) that was sent to the mapper ($M_j$) and an element ($b_j$) selected randomly from the algebraic structure and kept secret by the mapper ($M_j$), and generating respective pseudonyms (P) by sequentially performing, in a permutation of the mappers ($M_j$), a number k of mappings utilizing the mapping cryptographic keys ($h_{ij}$) of the mappers ($M_j$) belonging to the particular data source ($DS_i$) on each encrypted entity identifier ($C_{i0}$) encrypted by the data source ($DS_i$), further characterised by applying an algebraic structure constituting an additive cyclic group, wherein values are represented by points of elliptic curves defined over a number field of residue classes modulo p, where p is a prime number, for which algebraic structure the following constants are predetermined, parameters A, B of the formula $y^2 = x^3 + Ax + B \mod p$ defining the points of an elliptic curve defined over the residue classes of the prime number p, and a point G of the curve that has an order q that is greater than the number of entity identifiers (D), for generating the own cryptographic key ($e_i$) of each data source ($DS_i$), elements ($a_{ij}$) are selected from the residue classes mod q as elements ($d_{ij}$) corresponding in number to the number of the mappers ($M_j$), and the sum ($a_i$) of the elements is chosen as the own cryptographic key ($e_i$) of the data source ($DS_i$), for which the formula $e_i = a_i = \sum_{j=1}^{k} a_{ij}$, the elements ($a_{ij}$) are sent encrypted to the mappers ($M_j$), the mappers ($M_j$) are applied for decrypting their respective own elements ($d_{ij}$), and the mapping cryptographic key ($h_{ij}$) of each mapper ($M_j$) corresponding to the data source ($DS_i$) is generated applying the formula $h_{ij}=a_{ij}+b_j$, where the randomly selected secret element ($b_j$) is a value of the residue classes mod q and is different from zero and one, the encrypted entity identifier ($C_{i0}$) is computed by the data source ($DS_i$) utilizing the formula $C_{i0}=M\oplus a_i G$, where operator $\oplus$ is the sum of the points of the elliptic curve, and the sequential mappings of the mappers ($M_j$) are performed, from (s=0) to (s=k-1) applying the formula $C_{i,s+1}^{(j)}=C_{i,s}\ominus h_{ij}G$, where $A\ominus B=A\oplus(-B)$ and $P=C_{ik}$.

9. The method of claim 8, characterised in that the encrypted entity identifier ($C_{i0}$) is shared with the mappers ($M_j$) by writing it into a database that operates according to a protocol verified by third parties and provides decentralized authenticity.

10. The method of claim 9, characterised in that a blockchain database is applied as the database providing decentralized authenticity.

11. The method of claim 8, characterised in that the constants of the algebraic structure are generated by a key manager (KM), and the own cryptographic key ($e_i$) of the data source ($DS_i$) and the elements ($a_{ij}$) corresponding thereto are generated by the key manager (KM) and are sent encrypted to the data source ($DS_i$) and to the mappers ($M_j$).

12. A non-transitory computer-readable medium storing instructions, the instructions comprising one or more instructions that, when executed by a processor, cause the processor to carry out the steps of the method of claim 8.

13. A computing device comprising:
a memory; and
a processor, operatively coupled to the memory, to carry out the steps of the method of claim 8.

* * * * *